Sept. 2, 1969  E. M. BROCK  3,465,273
TOROIDAL INDUCTOR
Filed Dec. 14, 1967 2 Sheets-Sheet 1
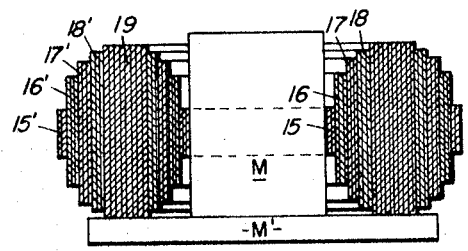
FIG. 1
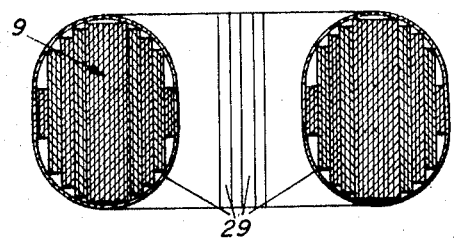
FIG. 2
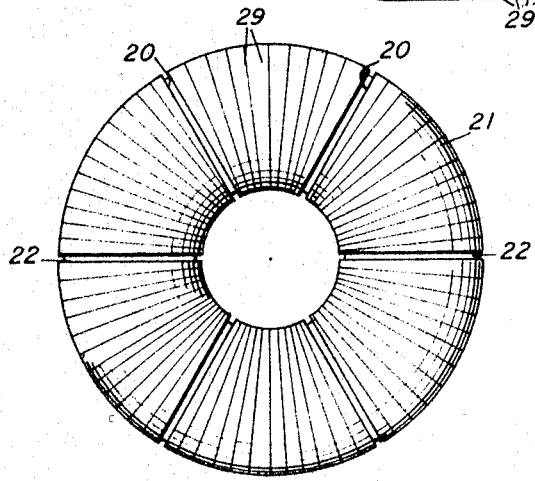
FIG. 3
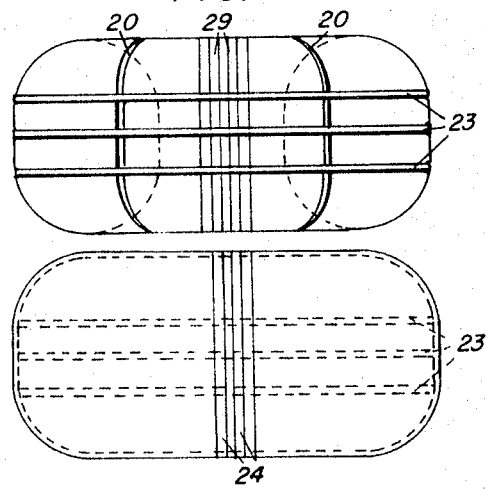
FIG. 4
FIG. 5
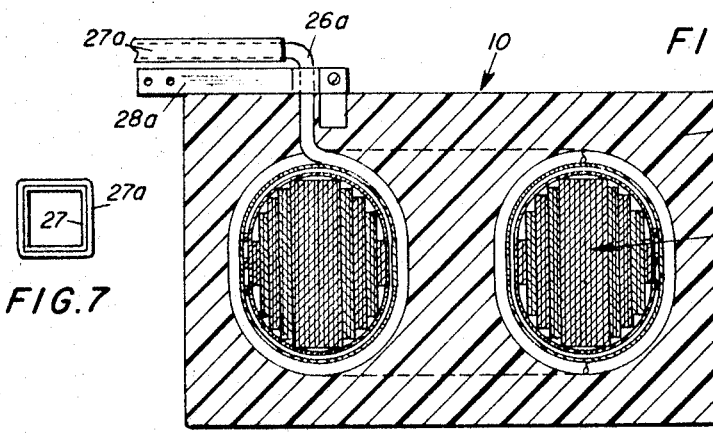
FIG. 7
FIG. 6
FIG. 8
INVENTOR
ELWOOD M. BROCK
BY Beale and Jones
ATTORNEYS Sept. 2, 1969     E. M. BROCK     3,465,273
TOROIDAL INDUCTOR Filed Dec. 14, 1967     2 Sheets-Sheet 2

INVENTOR
ELWOOD M. BROCK
BY Beale and Jones
ATTORNEYS

United States Patent Office 3,465,273
Patented Sept. 2, 1969

3,465,273
TOROIDAL INDUCTOR
Elwood M. Brock, Flemington, N.J., assignor to Hunterdon Transformer Company, Flemington, N.J., a corporation of New Jersey
Filed Dec. 14, 1967, Ser. No. 690,674
Int. Cl. H01f 27/08
U.S. Cl. 336—62         9 Claims

ABSTRACT OF THE DISCLOSURE

A high power inductor for use as a load impedance, comprising a ring-shaped segmented core having tubular windings and encapsulated in an epoxy, and a method for assembling the same is disclosed. The core is comprised of a plurality of radial laminations, with the segments being separated by rigid, nonmagnetic spacers which do not fill their respective gaps. The core assembly is held in place by a stainless steel strap, and the assembly is wrapped with a glass fiber tape saturated in epoxy and cured. The tape is then drilled to provide access to the core air gaps, and the tubular winding is wrapped on the core. By making the core generally circular or oval-shaped in cross section, the tubular winding is placed on the core with a minimum of lost space. The assembly is then vacuum encapsulated in a resin composition, the resin flowing into the core gaps and any other voids which might exist in the assembly. Upon curing of the resin, the inductor is capable of being operated at high power levels without vibration.

BACKGROUND OF THE INVENTION

The present invention relates, in general, to inductor devices and more particularly to high power inductors for use as load impedances in various applications.

It is well known that in numerous instances where large quantities of electrical power are required, as in many industrial applications, inductive impedances are often required to balance the load being applied to the power supply, to act as a choke to dampen current surges, and the like. A typical example of such an application is found in the field of electrical resistance furnaces, particularly where such a furnace is to be connected to a single phase of a conventional three phase input line. Connection of such a load to a three phase line seriously unbalances the line and requires inductive and capacitive impedances across the remaining two phases. Because of the amount of power consumed by electric furnaces, the inductive impedance so used must be able to handle a great deal of power without overheating. Another typical use of such devices is in current chokes wherein inductors must be used to dampen high peak pulses which might occur in the line.

Many prior attempts have been made to develop inductive impedances capable of handling power on the order of 500 kva., without success. The problem has been in the fact that in order to obtain the necessary impedance in such an inductor, it is necessary to provide an air gap in the iron core. Early attempts at producing inductors for this use led to the use of rectangular cores with a large air gap. However, the strength of the magnetic flux produced in the core by reason of the high currents carried by the windings produced a great deal of stray flux because of the inability of the flux to follow the angular turns in such cores or to pass through the large air gaps. Furthermore, the magnitude of the alternating flux fields was such that prior cores tended to vibrate very heavily, and virtually all such devices would break down mechanically after a relatively short period of use.

SUMMARY OF THE INVENTION

It is, therefore, an object of the present invention to provide an inductor capable of use under high power conditions as an impedance load.

It is another object of this invention to provide an electrical inductor to balance a three-phase line when a single phase resistor load is applied.

A further object is to provide an inductor that will handle a great deal of power as it acts as a load device.

Another object of the invention is to provide a toroidal core in an inductor which has no sharp corners and is made up of arcuate core segments having a small air gap therebetween so as to inherently produce very little stray flux.

Yet another object of the invention is to provide a toroidal core for an inductor that has a generally circular cross section core portion that facilitates the helical winding thereabout of inductance tubing.

A still further object of the invention is to provide a toroidal inductor that is relatively small in size for its impedance and which is encapsulated in an epoxy resin to form a rigid structure that will not permit vibration of its parts.

Briefly, the present invention contemplates an inductive device which is generally cylindrical in overall configuration. The inductor includes a magnetic core which is made by winding on a cylindrical mandrel lengths of core stock of an axial width that increases in steps to a maximum and then decreases so as to provide a core having a generally circular cross section about which copper tubing may be wound in fabricating the inductor coils. The core stock is suitably coated to maintain magnetic isolation between adjacent strips, or laminations. The core stock being wound around the cylindrical mandrel, the resultant laminations are generally radially arranged, with the wide surface of the laminations being parallel to the mandrel axis.

After being wound and secured from unwinding, the donut-shaped core is removed from the andrel and annealed to restore its magnetic characteristics, such as its permeability, which are destroyed in the winding process. At the same time, the mechanical stresses due to winding of the core stock under tension are relieved.

The annealed core is helically wound with an untreated open weave fiber glass tape to hold it together, and this tape is impregnated with a varnish under vacuum. The core is then heated to a relatively low temperature of about 225° F. to cure the varnish and to make a unitary mass so that the core will hold together while further fabrication takes place. The core is then cut into the desired number of segments. The cuts may be made, for example, with an abrasive wheel and a suitable coolant, the cuts being generally radial to form arcuate segments.

The segments so formed are assembled in a generally circular, or ring-like, configuration, adjacent segments being spaced by means of non-magnetic rigid spacers of appropriate thickness. Micarta, Formica or phenolic resin materials, approximately one-quarter inch thick have been found to be suitable, and produce air gaps between adjacent segments of the desired width. Of course, the specific width of the gap will depend upon the total number of segments and upon the impedance characteristics required. The spacers are smaller than the cross section of the core, so that they do not fill the gaps.

The arcuate core segments and spacers are assembled and held together by stainless steel straps fastened around the periphery of the core assembly with a conventional banding tool, thereby to hold the segments in place and render the assembled core self supporting. The core assembly is then wrapped with epoxy-saturated fiber glass tape and the epoxy is cured. The tape electrically insulates the core from the winding to be applied, and further secures the assembly. Holes are drilled in the tape, particularly in the areas of the gaps, so that when the device is encapsulated, the epoxy can seep through the tape and fill any and all voids.

Copper tubing of about three-fourths of an inch diameter is helically wound around the ring-shaped core to form a toroidal winding, the winding being formed with a sufficient number of turns to produce an inductor having the desired impedance. The turns may overlap in the center of the core to permit additional turns to be accommodated on the core. The tubing may be circular or rectangular in cross section, the rectangular tubing providing a large cross-sectional area of copper. With the core lying horizontally, the ends of the tubing are brought out at the top towards one edge and spaced apart, and appropriate bus bar leads may be affixed to each end. The assembly is then placed in a cylindrical vacuum tank for encapsulation with epoxy resin, and the resin is cured. The resin fills all voids between the tubular windings and within the core gaps, as well as filling out any irregularities in the surface of the core assembly, thereby producing a unitary inductor which is rigid, impervious to damage, and vibration free.

A number of the inductors formed as described above may be assembled in a suitable rack and their bus leads connected in parallel where higher power capabilities are required. The copper tubing used for the windings is connected at its ends to rubber hose or the like so as to permit circulation of a coolant such as water therethrough. The hose connections are of sufficient length, about four feet each for a 500 kva. inductor, to prevent significant current leakage. An inductor made in accordance with the present invention provides an assembly that operates silently and without vibration when used as an electrical load impedance, and is about one-third the size of other inductors having a comparable impedance.

BRIEF DESCRIPTION OF THE DRAWINGS

For a more complete understanding of the nature and scope of my invention, reference is had to the drawings, the following description and the claims which follow.

In the drawings:

FIG. 1 is a cross-sectional view of the core in place on a mandrel about which the core strip stock is wound;

FIG. 2 is a cross-sectional view of the core of FIG. 1 removed from the mandrel and having its first wrapping applied and which has been varnished and cured;

FIG. 3 is a top plan view of the wrapped toroidal core in FIG. 2 showing it having been cut into separate arcuate segments by radial cuts and dielectric spacers placed in the gaps formed by the radial separating cuts;

FIG. 4 is a front elevational view of the assembled core of FIG. 3 with non-magnetic bands applied around its middle portion;

FIG. 5 is a side elevational view of the core like that in FIG. 4 having had applied a wrapping of fiber glass tape that has been saturated with epoxy and cured;

FIG. 6 is a vertical cross-sectional view of the toroidal core of FIG. 5, encapsulated in an epoxy resin and having copper inductance tubing helically wound thereon and attached at the top to bus bar leads;

FIG. 7 is an enlarged cross-sectional view of copper tubing showing a square in cross section tubing that may be used and a dielectric covering;

FIG. 8 is a cross-sectional view of the copper tubing that is circular in cross section and provided with a dielectric covering;

DESCRIPTION OF A PREFERRED EMBODIMENT

Throughout the description, like reference numbers refer to similar parts.

Figure 11:
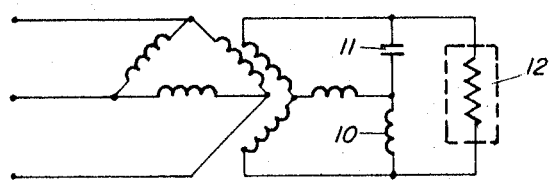
FIG. 11 is a schematic wiring diagram showing an inductor and a capacitor connected to balance a three-phase line with a single phase resistor load applied.

In FIG. 11 a toroidal inductor 10 and a capacitor 11 are shown balancing a three-phase line having a single phase resistance load 12 applied. A typical resistance load 12 would be an electric furnace which, as is well known, requires a great deal of power; in particular, such a load is exemplified by a Swiss made furnace which operates on a single phase only. The inductor 10 and capacitor 11 are placed across the other two phases to balance the three-phase line and compensate for the heavy resistance loading. The inductor 10 must be able to handle a great deal of power as it acts as a load device. In order to obtain the necessary impedance in such an inductor, it is necessary to provide an air gap in the iron core, but such gaps make inductors susceptible to damage from vibration. To solve this problem, the inductor of the present invention was devised.

The structure of an inductor made in accordance with the present invention will now be described and illustrated in conjunction with a description of the manner in which such an inductor is assembled, and the various features of the structure will become apparent therefrom. Referring now to FIG. 1, the core used in the present inductor device is formed about a mandrel M having a base M' by winding under tension continuous strips of core stock starting with relatively narrow stock windings as indicated at 15, as measured in the axial direction of the core, and increasing in steps of greater axial width at 16, 17, 18 and 19 and then decreasing in axial width as indicated by the outer windings of core stock at 18', 17', 16', and 15'. The core stock is in continuous strips for each respective width, and is coated so as to maintain magnetic isolation between adjacent strips. The resultant core structure 9 provides in cross section a generally circular shape for the wound laminations and this shape facilitates the helical winding of copper tubing thereabout that forms the inductance as well be explained. The wound core in FIG. 1 is secured by suitable temporary bands thereabout (not shown) and then removed from the mandrel. Further temporary securing turns of wire may be helically applied as a temporary holding measure.

Upon removal of the core from its forming mandrel and securing of the laminated strips, the core is annealed to restore its magnetic characteristics such as, its permeability, which was destroyed in the winding step. The annealing step also serves to relieve any mechanical stresses in the core material which might have been caused by the winding step, which is done under tension to insure that the core laminations are held tightly together so that there will be no vibration in the laminations.

The annealed donut-shaped core, see FIG. 2, is then wound helically with untreated open weave fiber glass tape 29, partially shown, to hold the wound laminations together as the temporary holding bands or windings (not shown) are removed. A varnish is applied under vacuum to the tape windings. The varnish seeps through the open mesh tape and fills the voids and cracks. The assembly is heated to a relatively low temperature of about 225° F. to cure the varnish.

The assembled tape wound rigid core is then cut into the desired number of segments by making radially extending cuts as at 20 as with an abrasive wheel with which a coolant is used. The segments 21 so formed are then spaced apart about one quarter of an inch and in each of these gaps there is placed a spacer 22. These spacers are of dielectric material such as Micarta, Formica or phenolic resin material. The spacers 22 do not fully fill the gaps, as indicated in FIG. 3, leaving spaces at the ends that will be filled by the encapsulating epoxy resin.

After the proper spacing of the segments 21 and placement of the spacers 22, the assembled core segments, six here shown, see FIG. 4, have securing non-magnetic strapping bands 23 applied by an ordinary banding tool. Stainless steel may be used as the securing bands and three spaced apart bands are shown in the assembled core in FIG. 4. This core assembly is now self supporting.

In FIG. 5 there is shown the self supporting core of FIG. 4 having been helically wound with fiber glass tape 24, partially illustrated, that has been saturated in a suitable epoxy before applying. This wound and saturated tape is then cured, thereby adding to the supporting structure of the core assembly as well as providing additional electrical insulation between the core and the windings which are to be applied.

Holes (not shown) are drilled through the wrapping tape at appropriate points so as to provide access to any interior void pockets and cavity areas. These drilled holes allow the encapsulating epoxy which is applied at a later step to fill in the pockets formed by the steps in the laminations, for the tape does not follow the exact contour of the magnetic core but forms a generally circular or oval cross section, as shown in FIG. 6.

The assembled core is now ready to have the copper inductance tubing 26 installed. A stock of copper tubing of up to about three quarters of an inch diameter preferably is used and is supplied in a coil. An end of the tubing is passed through the center of the donut shaped core and the winding progresses in helical manner by winding off of the coil stock onto the core. The tubing 26 may be coated or have an insulating sleeve 26a thereon as shown in FIG. 8.

FIG. 7 illustrates a form of square or rectangular in cross section tubing 27 that may be used. This rectangular in shape tubing would provide more cross sectional area of copper material than is available in conventional tubing of circular cross section.

The windings are suitably spaced about the core; preferably they are symmetrical on the core with an equal number of turns being placed on each segmented core section 21. At the center of the core the tubing will of necessity have to overlap, as shown in FIG. 9, where a a large number of turns are to be accommodated on the core.

The ends 26a and 26b of the inductance winding tubing 26 are brought out at the top of the assembly and are clamped to buss bar leads 28a and 28b respectively. The core assembly together with the inductance tubing is placed in a cylindrical vacuum molding tank (not shown) and epoxy resin is applied and cured. The epoxy resin indicated at 30 fills all of the spaces between the copper tube windings and any voids within the fiber glass tape. This encapsulation produces a toroidal inductor having a generally cylindrical shape. The resulting strong and rigid structure will withstand constant use and will not vibrate and shake itself apart. A toroidal inductor as here made may be about one-third the size of prior inductors providing the same impedance.

Figure 9:
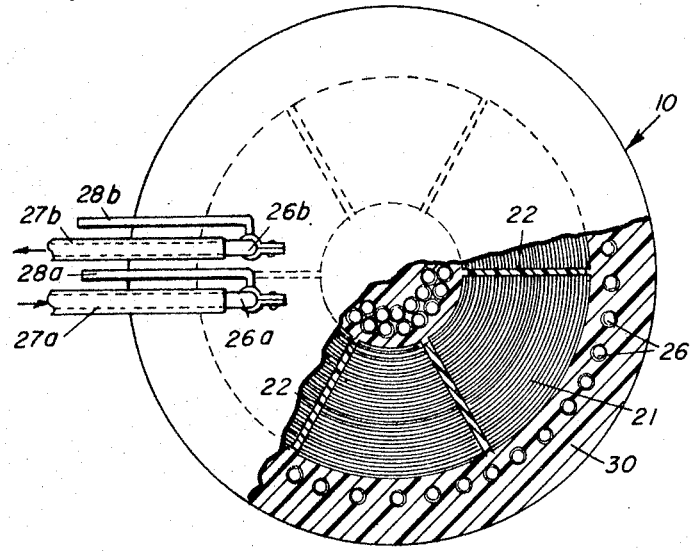
FIG. 9 is a top plan view of the assembled toroidal inductor of FIG. 6 showing a portion broken away to depict the relative positioning of the tube inductance winding, the segmental cores, and their laminations, the dielectric spaces and the tubular leads and their connections with busses.

In FIGS. 6 and 9, the ends of the copper inductance tubing 26a and 26b have rubber hose 27a and 27b slipped thereover which may be connected to a coolant supply (not shown) such as water. It has been found that about four feet of rubber tubing connected in the coolant supply will substantially block the flow of current and that there will be no current leakage into the external water supply.

A 500 kva. inductor as here made and depicted is about 27 inches in overall diameter and about 24 inches high. Such an inductor would have as here illustrated, for example, six gaps in the core of a quarter of an inch each. The inductor is suitable for use as a storage device having a phase angle 180° opposite that of the capacitor. Thus it is an inductive load and restores energy to the line. It does not dissipate energy, except for the $I^2R$ losses in the copper winding.

Figure 10:
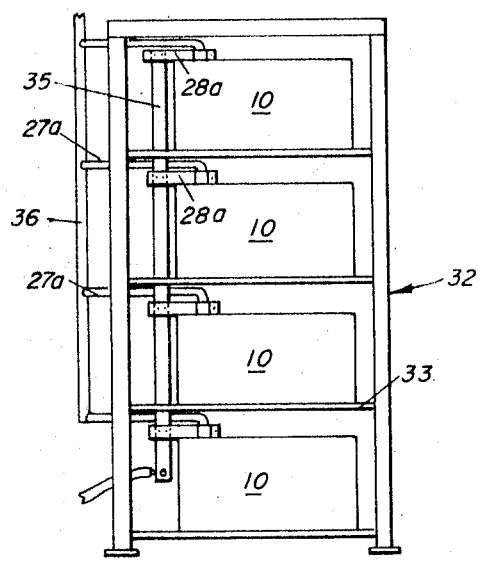
FIG. 10 is a front elevational view of a vertical rack supporting four inductors on shelves and connected to bus bars and hose connection to the copper inductance tubing.

In FIG. 10 a vertical rack 31 is illustrated having four horizontally extending vertically spaced apart shelves 33. On each of these shelves is mounted a toroidal inductor 10 and these are connected in parallel to respective bus bars 35 and coolant supply tubing and conduits 36. Such an arrangement of inductors permits several to be connected in parallel to provide greater capacity, where required.

Thus, there has been provided an inductor capable of providing an inductive load in high power application which will be vibration and noise free, long lasting, smaller in size than prior devices of equal impedance value, and which will operate at greater efficiency because of reduced stray flux. These advantages are accomplished through the provision of a segmented, ring-shaped magnetic core firmly held in place as described and surrounded by a toroidal winding, with the whole assembly being encapsulated in an epoxy resin. It will be apparent to those skilled in the art that numerous changes and modifications may be made in the device as described, without departing from the true spirit and scope of the invention as defined in the following claims.

I claim as my invention:

1. In a high power electrical inductor, a magnetic core of generally ring-like shape and comprised of a plurality of layers of core stock wound about an axis to form radial laminations, said core stock varying in axial width to form a core of generally circular cross-section, said core being divided into a plurality of arcuate segments;
   dielectric spacer means between adjacent core segments to space said core segments and to provide relatively narrow gaps therebetween,
   nonmagnetic band means around the periphery of said magnetic core to hold said core segments and spacer means in assembled relationship;
   electrically conductive nonmagnetic tubing helically wound about said magnetic core to form a toroidal winging having a plurality of turns, the end portions of said tubing being adapted for connection to electrical conductors for supplying current to said winding;
   insulating means between adjacent turns of said winding and between each said turn and said magnetic core;
   dielectric tubing connected to each end of said electrically conductive tubing for circulation of coolant through said winding and for preventing current leakage from said winding;
   said inductor being encapsulated in a synthetic resin dielectric composition which fills all voids around said magnetic core, within said gaps, and around said electrically conductive tubing and holding the inductor rigid, whereby said inductor is capable of handling large amounts of electrical power without vibration or noise.

2. The high power inductor of claim 1, wherein said segments of said magnetic core are formed by means of radially extending cuts through said core, and said spacer means do not fill said gaps.

3. The high power inductor of claim 2, further including a cured, epoxy saturated fiber glass tape helically wound about said core and said nonmagnetic band means to secure said core segments and spacer means and to electrically insulate said magnetic core from said conductive tubing.

4. The high power inductor of claim 3, wherein said core stock varies in axial width in steps, to form a core having a cross-section which varies in axial width in increasing steps from a minimum width at the inner diameter of said core to a maximum width at a median diameter, and in decreasing steps from said median diameter back to said minimum axial width at the outer diameter of said core, thereby forming a core adapted to receive said toroidal winding of conductive tubing.

5. The high power inductor of claim 4, wherein said band means is a stainless steel band and said encapsulating dielectric composition is an epoxy resin.

6. The high power inductor of claim 4, wherein said insulating means between adjacent turns of said winding comprises an insulating sleeve on said tubing.

7. The high power inductor of claim 4, wherein adjacent turns of said helically wound tubing overlap in the center of said core, whereby a larger number of turns may be accommodated on said core.

8. The method of assembling an electrical inductor for use as a load impedance and capable of handling large amounts of power without overheating and without vibration or noise, comprising the steps of:
  (a) winding under tension core stock of varying axial widths about a mandrel to form a magnetic core having radial laminations and a generally circular cross-section;
  (b) removing said core from said mandrel and annealing said core to restore its magnetic characteristics and to relieve mechanical stresses;
  (c) helically winding said core with an open weave glass fiber tape;
  (d) impregnating said tape under vacuum with varnish and heat curing said varnish;
  (e) cutting said core into a plurality of segments, and placing nonmagnetic spacers between adjacent segments to provide a core assembly having a plurality of narrow gaps, said spacers being smaller than the gaps so formed;
  (f) wrapping the periphery of said core assembly with a nonmagnetic band to hold said core segments and spacer means in assembled relationship;
  (g) wrapping said core assembly with epoxy-saturated glass fiber tape to secure and insulate said assembly, and curing said epoxy;
  (h) drilling holes in said cured epoxy-saturated glass filter tape to provide access to voids within said tape in the area of said gaps;
  (i) helically winding copper tubing around said core to form a toroidal winding; and
  (j) vacuum encapsulating said core assembly and toroidal winding in epoxy resin, said resin filling all voids around said core, gaps and winding, and curing said resin to form a unitary inductor assembly.

9. The method of claim 8, wherein said core is cut into segments by radially extending cuts, said cuts being spaced to provide substantially equal segments.

References Cited

UNITED STATES PATENTS

| | | | |
|---|---|---|---|
| 1,531,681 | 3/1925 | Auty | 336—229 XR |
| 1,882,075 | 10/1932 | Gebhard | 336—62 |
| 2,446,999 | 8/1948 | Camilli | 336—229 XR |
| 2,591,339 | 4/1952 | Davis | 336—62 XR |
| 2,782,386 | 2/1957 | Cornell | 336—62 XR |
| 2,888,541 | 5/1959 | Netzer | 336—62 XR |
| 3,040,162 | 6/1962 | Hunter | 336—62 XR |
| 3,201,734 | 8/1965 | Halacsy | 336—229 XR |
| 3,210,702 | 10/1965 | Carrigan et al. | 336—96 XR |

LEWIS H. MYERS, Primary Examiner

T. J. KOZMA, Assistant Examiner

U.S. Cl. X.R.

29—605, 606; 336—96 219, 229